United States Patent [19]

McFarland

[11] Patent Number: 4,773,220
[45] Date of Patent: Sep. 27, 1988

[54] HYDRAULIC TRANSMISSION WITH COAXIAL POWER-TAKE-OFF AND MOTOR SHAFTS

[76] Inventor: Douglas F. McFarland, Rte. 1, Davis City, Iowa 50065

[21] Appl. No.: 109,747

[22] Filed: Oct. 19, 1987

[51] Int. Cl.⁴ .............................................. F16H 39/12
[52] U.S. Cl. ........................................ 60/487; 60/488
[58] Field of Search ........................... 60/401, 487–489

[56] References Cited

U.S. PATENT DOCUMENTS

| | | | |
|---|---|---|---|
| 2,570,843 | 10/1951 | Orshansky | 60/489 |
| 3,664,128 | 5/1972 | Heyl | 60/325 |
| 4,686,829 | 8/1987 | Thoma et al. | 60/487 X |

FOREIGN PATENT DOCUMENTS 712471  7/1954  United Kingdom ................. 60/487

*Primary Examiner*—Robert E. Garrett
*Assistant Examiner*—George Kapsalas
*Attorney, Agent, or Firm*—Zarley McKee, Thomte, Voorhees & Sease

[57] ABSTRACT

The present invention is a hydraulic transmission comprising a power input shaft, a variable displacement pump connected to and driven by the input shaft, a fixed displacement motor having a motor output shaft, a power take-off shaft, and an intermediate shaft. The intermediate shaft is connected between the power input shaft and the power take-off shaft for transmitting rotational movement directly therebetween. The intermediate shaft also includes first and second bores extending longitudinally therethrough and providing hydraulic connections from the variable displacement pump to the fixed displacement motor so as to permit the pump to drive the motor. Thus, the power input shaft drives the power take-off shaft directly and drives the motor output shaft by virtue of the hydraulic connection between the pump and the motor.

7 Claims, 2 Drawing Sheets

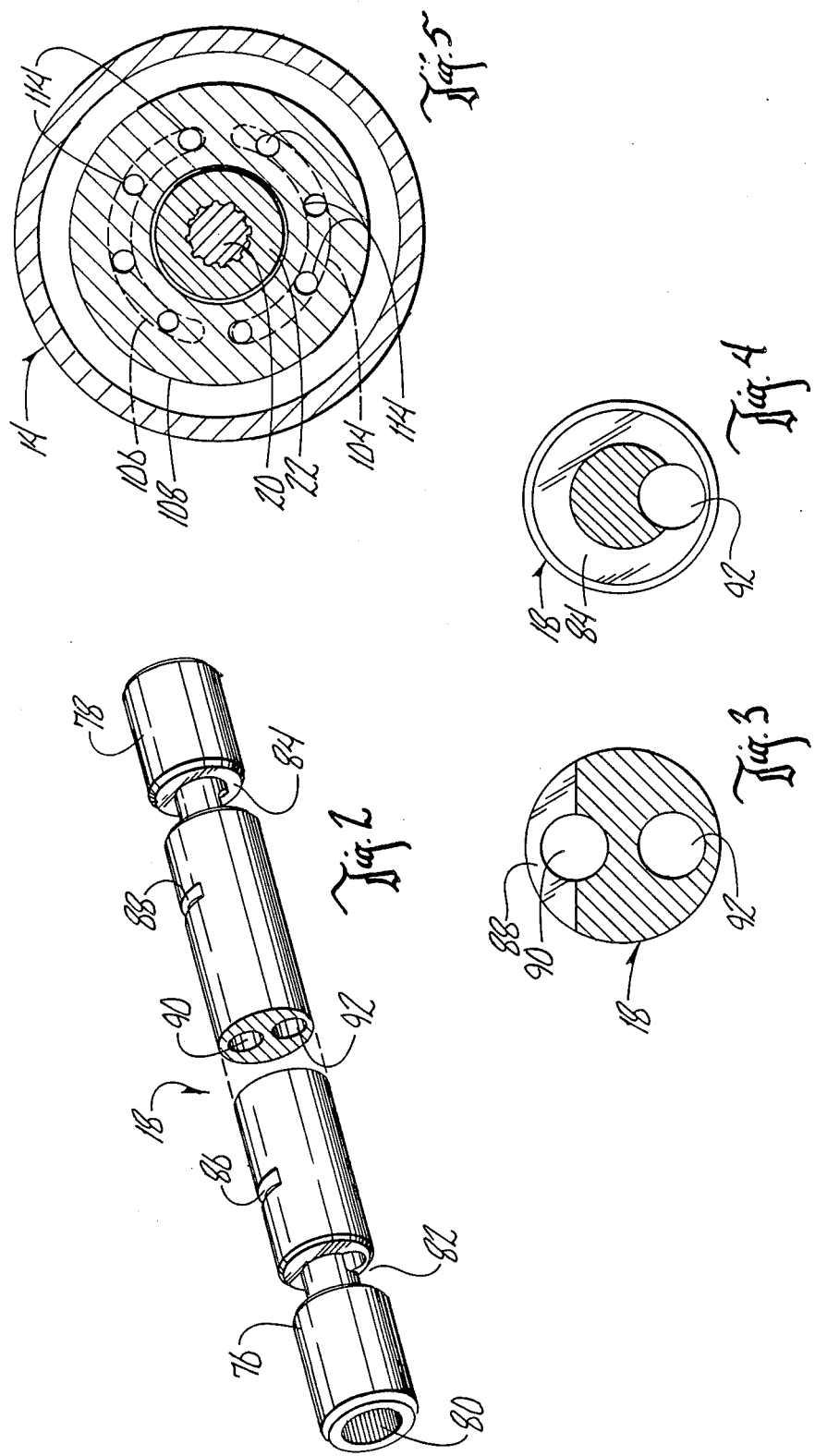

HYDRAULIC TRANSMISSION WITH COAXIAL POWER-TAKE-OFF AND MOTOR SHAFTS

BACKGROUND OF THE INVENTION

The present invention relates to a hydraulic transmission.

Present hydraulic transmissions include a variable displacement hydraulic pump driven by an input shaft. A hydraulic fluid is pumped from the hydraulic pump to a fixed displacement hydraulic motor for driving an output shaft driven by the motor. In these devices, there is no direct mechanical interconnection between the input shaft which drives the hydraulic pump and the output shaft which is driven by the hydraulic motor.

Therefore, a primary object of the present invention is the provision of an improved hydraulic transmission.

A further object of the present invention is the provision of a hydraulic transmission including a power take-off shaft driven directly by the power input shaft and also including a second output shaft driven by a combination hydraulic motor-hydraulic pump which are driven by the power input shaft.

A further object of the present invention is to produce increased operational efficiencies through the elimination of costly friction losses as well as eliminating some of the volumetric losses of the hydraulic fluid in the operation of the device.

A further object of the present invention is the provision of a hydraulic transmission which can be produced by modifying presently existing hydraulic transmissions with a minimum of parts to produce the new transmission.

A further object of the present invention is the provision of a hydraulic transmission including an intermediary shaft extending between the hydraulic motor and the hydraulic pump and also interconnecting the input shaft to the power take-off shaft of the device.

A further object of the present invention is the provision of a hydraulic transmission including the above described intermediary shaft wherein the intermediary shaft also provides a means for carrying fluid back and forth between the hydraulic pump and hydraulic motor.

A further object of the present invention is the provision of a device which is economical in manufacture, durable in use and efficient in operation.

SUMMARY OF THE INVENTION

The present invention provides a novel hydraulic drive transmission. The transmission includes a variable displacement pump which is connected to and driven by a power input shaft. A fixed displacement motor is hydraulically connected to the variable displacement pump and is driven by the pump so as to rotate a motor output shaft.

Located coaxially within the motor output shaft is a power take-off shaft which is mechanically connected to the power input shaft by means of an intermediate shaft having an input end operatively connected to the input shaft and having an output end operatively connected to the power take-off shaft. Thus, the power take-off shaft is driven directly by the power input shaft, whereas the motor output shaft is driven hydraulically by virtue of the variable displacement pump and the fixed displacement motor.

One important feature of the present invention is the intermediate shaft which includes two longitudinal hydraulic passageways which extend therethrough. These passageways are hydraulically connected to the variable displacement pump and the fixed displacement motor. Thus, the hydraulic circuitry from the pump to the motor passes through the two passageways within the intermediate shaft. One of the two passageways is for exhaust pressures and one is for intake volume. Thus, the intermediate shaft performs two functions, i.e., carrying fluid back and forth between the hydraulic pump and hydraulic motor, and transferring the rotational movement directly from the input shaft to the power take-off shaft.

BRIEF DESCRIPTION OF THE DRAWINGS

FIG. 2 is a perspective view of the intermediate shaft of the present invention.

FIGS. 3, 4 and 5 are sectional views taken along lines 3—3, 4—4 and 5—5, respectively.

DETAILED DESCRIPTION OF THE PREFERRED EMBODIMENT

Figure 1:
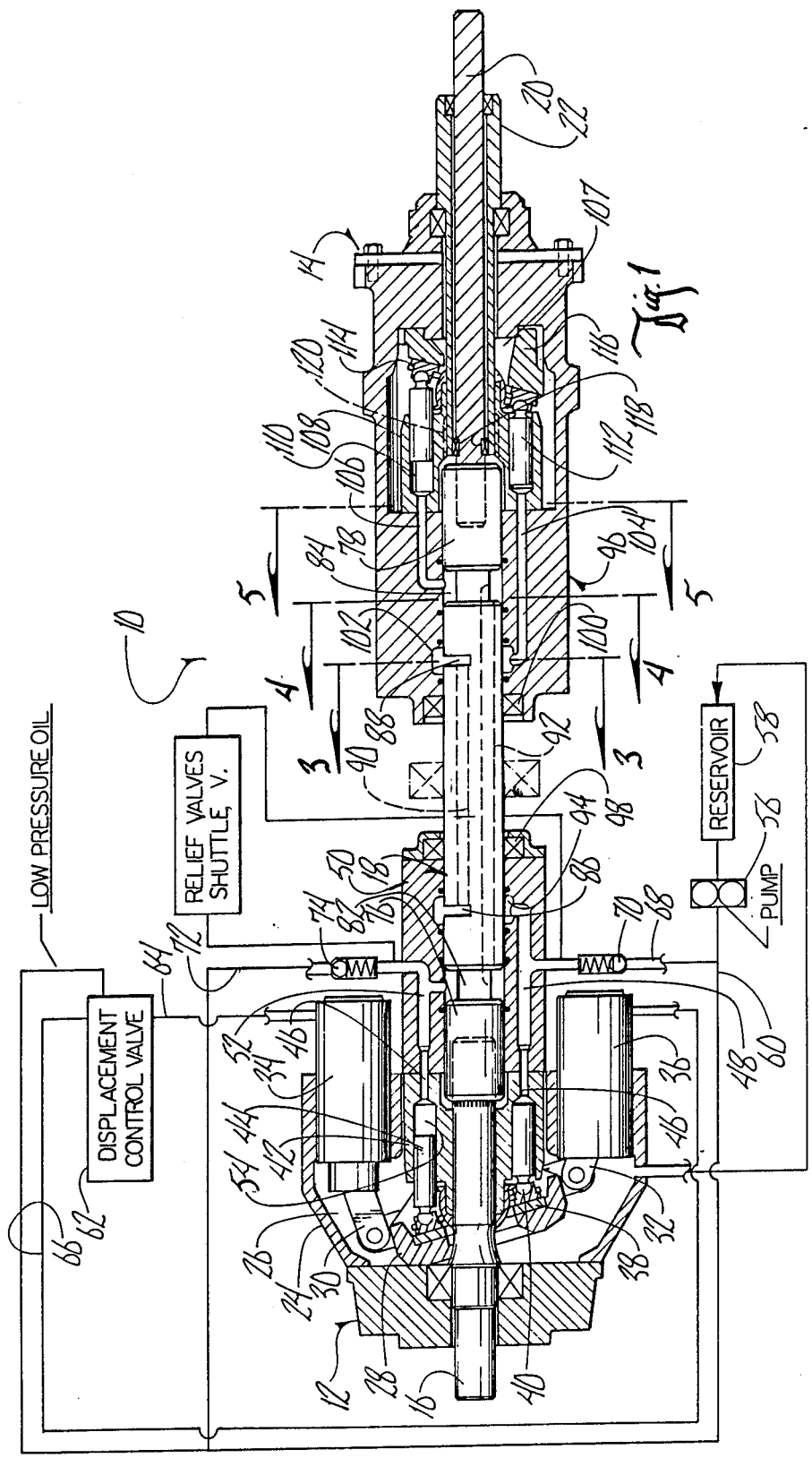
FIG. 1 is a longitudinal sectional view through the hydraulic transmission of the present invention.

Referring to the drawings, the numeral 10 generally designates the hydraulic transmission of the present invention. Transmission 10 comprises a variable displacement pump 12, a fixed displacement motor 14, a power input shaft 16, an intermediate shaft 18, a power take-off shaft 20, and a variable speed output shaft 22.

Variable displacement pump 12 comprises an outer housing 24 having a fluid chamber 26 therein. A pump swashplate 28 is mounted within fluid chamber 26, and is connected by links 30, 32 to the pistons of hydraulic cylinders 34, 36, respectively. Extension of hydraulic cylinder 34 and retraction of hydraulic cylinder 36 causes swashplate 28 to tilt in the direction shown in FIG. 1. This tilting movement can be reversed by retracting the piston of cylinder 34 and extending the piston of cylinder 36.

Swashplate 28 includes a rotatable plate 38 which is nested in a recess therein. Plate 38 is mounted to a ball and socket gimbol mount 40 which connects plate 38 to a pump rotor 42. Pump rotor 42 also includes a plurality of pistons 44 which are swivelly connected to plate 38.

Rotor 42 is fixedly attached to shaft 16 by splines or other convenient means so that rotation of shaft 16 causes rotor 42 to rotate in unison therewith. Rotation of rotor 42 causes plate 38 also to rotate and because of the angled disposition of swashplate 28, the pistons 44 are alternatively reciprocated back and forth during the rotation of rotor 42. In FIG. 1, the upper piston 44 is shown in the extended position and the lower piston 44 is shown in the retracted position. As the piston 44 moves from its extended to its retracted position, it forces fluid outwardly through a port 46 into a pressure conduit 48 which is within a pump manifold 50. Pump manifold 50 also includes a return or low pressure conduit 52, and ports 46 move into communication with return conduit 52 whenever the pistons 44 are in their extended position, as shown in the upper portion of FIG. 1. Thus, the cylinder 54 in which piston 44 slides is charged with fluid when the ports 46 are in communication with return conduit 52 and when piston 44 moves to its extended position. Pressure conduit 48 and return conduit 52 can be reversed by reversing the angular disposition of swashplate 28. This can be accomplished by extending piston 36 and retracting piston 34.

A charging pump 56 is connected to a reservoir 58, and is adapted to pump fluid through a line 60 which is in communication with a displacement control valve 62. Extending from displacement control valve 62 are two lines 64, 66 which are connected to pistons 34, 36, respectively, for controlling the positions of pistons 34, 36, and thereby adjusting the angle of swashplate 28. Hydraulic line 60 is also connected to pressure conduit 48 by means of a hydraulic line 68 which includes a check valve 70 therein. Similarly, line 60 is connected to return conduit 52 by means of a hydraulic line 74 which has a check valve 80 therein. Check valves 70, 74 permit pump 56 to charge the conduits 48, 52 whenever pressure drops within conduits 48, 52. However, the check valves 70, 74 prevent fluid from backing up in lines 60, 72 in response to increased pressure within conduits 48, 52.

Intermediate shaft 18 is shown in detail in FIG. 2. Shaft 18 comprises a pair of sockets 76, 78, each of which is provided with a splined bore 80. Shaft 18 also includes a pair of annular grooves 82, 84 therein. Between annular grooves 82, 84 are a pair of spaced apart partial circumferential slots 86, 88. A first longitudinal bore 90 and a second longitudinal bore 92 extend longitudinally through body member 18. As can be seen by the shadow lines in FIG. 1, first bore 90 extends between the circumferential slots 86, 88, and longitudinal bore 92 extends between annular grooves 82, 84. Socket 76 is slidably fitted over a splined end of input shaft 16 as shown in FIG. 1, so as to rotate in unison with shaft 16. Annular groove 82 is in communication with return conduit 52 of manifold 50, and slot 86 is in communication with pressure conduit 48 of manifold 50 by means of an annular channel 94.

The other end of intermediate shaft 18 is rotatably inserted within a motor manifold 96 and is rotatably supported by bearings 98, 100 within pump manifold 50 and motor manifold 96, respectively. Slot 88 of secondary shaft 18 is in communication with an annular channel 102 within manifold 96 which in turn is in communication with a pressure conduit 104 within manifold 96. Annular groove 84 of intermediate shaft 18 is in communication with a return conduit 106 within manifold 96.

Within motor 14 is a rotor chamber 107 having a rotor 108 rotatably mounted therein. Rotor 108 includes a plurality of cylindrical chambers 110 in which are mounted pistons 112. Chambers 110 include ports 114 which are adapted to move into communication with conduits 104, 106 within manifold 96. Rotor 108 is attached to variable speed shaft 22 so that shaft 22 rotates in unison with rotor 108. Pistons 112 are swivelly attached to a rotating plate which is angularly disposed and which slides against an angular swashplate 116. As pressure is introduced to the lowermost piston 112, as viewed in FIG. 1, through pressure conduit 104, the piston 112 is extended and places pressure on the rotating plate 114, which results in rotational movement of plate 114 and rotor 108. This causes rotation of shaft 22. As the piston reaches the position shown for the uppermost piston 112 in FIG. 1, it is again reciprocated to its retracted position, thereby forcing hydraulic fluid within chamber 110 through port 114 into return conduit 106.

Power take-off shaft 20 is rotatably mounted within shaft 22 by means of bearings 118, and has an inner splined end 120 inserted within the splined bore 80 of socket 78 of intermediate shaft 18. Thus, power take-off shaft 20 is directly connected to input shaft 16 by means of intermediate shaft 18, and rotates in a one to one ratio therewith.

In operation, the displacement control valve 62 is used to place swashplate 28 in the desired angular position. Rotation of input shaft 16 causes pump rotor 42 to rotate thereby forcing hydraulic fluid into pressure conduit 48, annular channel 94, arcuate slot 86, first bore 90 of intermediate shaft 18, arcuate slot 88 of intermediate shaft 18, annular channel 102 of motor manifold 96, and pressure conduit 104 of motor manifold 96. This forces piston 112 against rotating plate 114 so as to cause rotation of rotor 108. As the piston 112 reaches its uppermost position shown in FIG. 1, it is in communication with return conduit 106, and as the piston 112 is retracted, it forces the hydraulic fluid within chamber 110 through bore 114 and return conduit 106 to the annular groove 84, the bore 92 within intermediate shaft 18, to the annular bore 82 and thence into the return conduit 52 of pump manifold 50. This permits the recharging of the cylinder 54 within pump rotor 42. The check valves 70, 74 permit the charging pump 56 to charge either conduit 48 or conduit 52 in the event of any reduction in hydraulic pressure therein.

FIG. 5 illustrates a sectional view through motor rotor 108, and illustrates how the ends of channels 104, 106 are shaped in a semi-circular configuration so as to be in communication with several ports 114 at the same time. The conduits 48, 52 of pump 12 are similarly arranged with respect to ports 46 of pump rotor 42.

It is believed that the present invention produces increased operational efficiencies through elimination of costly friction losses, as well as minimizing volumetric losses of hydraulic fluid. The invention is also believed to reduce friction and motion losses of reciprocating parts.

The intermediate shaft 18 with its two passageways, one for exhaust pressures and one for intake, is coupled both to the hydraulic pump 12 and to the hydraulic motor 14 for driving shaft 22. At the same time, intermediate shaft 18 mechanically couples input shaft 16 directly to power takeoff shaft 20.

Thus, it can be seen that the device accomplishes at least all of its stated objectives.

What is claimed is:
1. A hydraulic transmission comprising:
   a power input shaft;
   a variable displacement pump connected to and driven by said input shaft, said variable displacement pump having a high pressure outlet and a low pressure inlet;
   a fixed displacement motor having a high pressure inlet and a lower pressure outlet, said fixed displacement motor having a motor output shaft;
   a power take-off shaft;
   an intermediate shaft having an input end cooperatively connected to and rotatably driven by said power input shaft and having an output end operatively connected to said power take-off shaft for transferring rotation from said power input shaft to said power take-off shaft;
   said intermediate shaft having first and second bores extending longitudinally therethrough, each of said first and second bores having first and second opposite ends;
   motor conduit means connecting said high pressure inlet of said motor in communication with said second end of said first bore and connecting said lower pressure outlet of said motor in communication with said second end of said second bore;

pump conduit means connecting said high pressure outlet of said pump to said first end of said first bore, and connecting said low pressure inlet of said pump to said first end of said second bore.

2. A hydraulic transmission according to claim 1 wherein said intermediate shaft is directly connected to both of said power input shaft and said power take-off shafts for causing said power take-off shaft to rotate in a 1:1 ratio with said power input shaft.

3. A hydraulic transmission according to claim 2 wherein said power input shaft, said intermediate shaft, and said power take-off shaft are in longitudinal alignment with one another and are connected in end to end relation.

4. A hydraulic transmission according to claim 1 wherein said motor output shaft surrounds said power take-off shaft in coaxial relation thereto.

5. A hydraulic transmission according to claim 1 wherein said intermediate shaft comprises an elongated cylindrical body member having an outer cylindrical surface with first and second spaced apart annular grooves therein, said first and second ends of one of said first and second bores being in communication with said first and second annular grooves respectively, said first and second ends of said other of said first and second bores being positioned between said first and second annular grooves.

6. A hydraulic transmission according to claim 5 wherein said first and second ends of said other of said first and second bores extend in a radial direction with respect to said cylindrical body and exiting through said outer cylindrical surface of said body member.

7. A hydraulic transmission according to claim 6 wherein said pump conduit means comprises a pump housing.

* * * * *